Patented Sept. 17, 1935

2,015,011

UNITED STATES PATENT OFFICE 2,015,011

ANTHRAQUINONE DYESTUFFS AND PROCESS OF PREPARING THEM

Norman Hulton Haddock and Frank Lodge, Blackley, Manchester, England, assignors to Imperial Chemical Industries Limited, a corporation of Great Britain No Drawing. Application November 3, 1932, Serial No. 641,114. In Great Britain November 13, 1931

21 Claims. (Cl. 260—60)

The present invention relates to new anthraquinone dyestuffs and to their application to the fiber to give fast dyeings.

More particularly, this invention relates to anthraquinone derivatives of the following general formula:

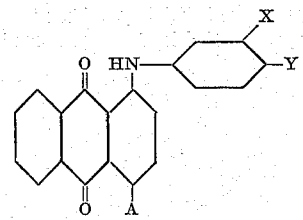

wherein X and Y respectively represent one or the other of a pair of substitutes represented by $NH_2$ and $S-CH_2-COOM$ (M=H or a metal) or wherein X and Y jointly represent the lactam formed from the above pair of substituents; wherein A stands for the radical OH, the group NHR (R=alkyl or aryl) or the group

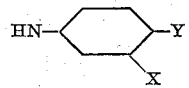

(X and Y having the same significance as above); and wherein the anthraquinone nucleus may carry auxochromic substituents, such as hydroxy, nitro, amino, or sulfonic acid, or the entire molecule may carry sulfonic acid groups of indefinite position, introduced by sulfonation after synthesis.

According to this invention, we effect interaction between an amino-3-keto-2,3-dihydrobenz-1,4-thiazine and a 1-hydroxyanthraquinone or a leuco derivative thereof, we oxidize the product of interaction, if necessary, and we subject the so-obtained anthraquinonylamino-3-keto-2,3-dihydrobenz-1,4-thiazine to hydrolysis to give the substituted thioglycollic acid of which it is the lactam.

The so-obtained anthraquinonylamino-aniline-o-thioglycollic acids are capable of dyeing animal fibers by the ordinary processes from a neutral, or weak, acid bath. The invention comprises the application of the dyestuffs to animal fibers in this way, followed by a treatment with hot dilute mineral acid to give fast dyeings, remarkable for their fastness to potting.

The above series of reactions may be illustrated by the following system of equations:

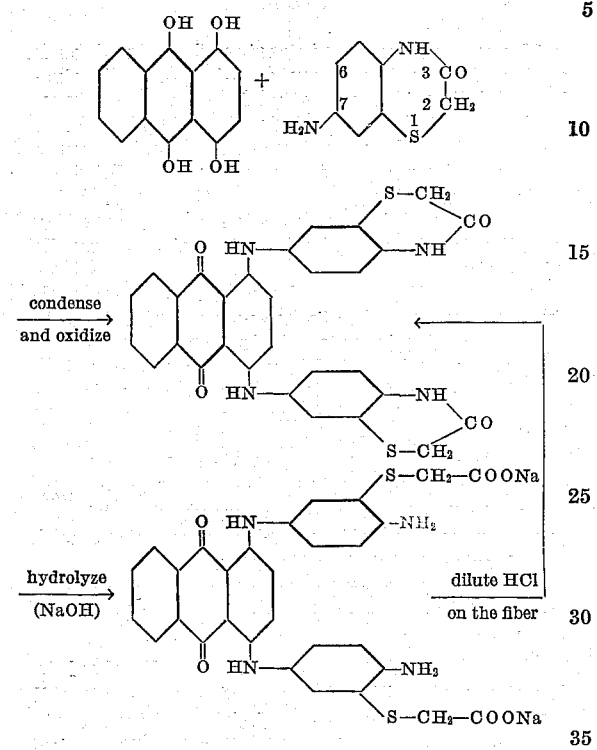

The 1-hydroxy-anthraquinones or leuco derivative thereof used in accordance with the invention may carry substituents. Generally any of those specified in British Patents Nos. 4,961 of 1895 and 7,538 of 1896 may be used. The interaction between them and the amino-3-keto-2,3-dihydrobenz-1,4-thiazines is carried out according to the general methods disclosed in those specifications.

Thus, according to British Patent No. 4,961 of 1895, a hydroxy-anthraquinone or a derivative thereof is condensed with a primary aromatic amino compound, and in British patent No. 7,538 of 1896, quinizarine and other hydroxy-anthraquinones are converted into their leuco compounds and condensed with amines by various methods, boric acid being used to facilitate the condensation. We find that pyridine or dimethyl-aniline is a suitable solvent.

The amino-3-keto-2,3-dihydrobenz-1,4-thiazines used in accordance with the invention are the 7-amino- and 6-amino-3-keto-2,3-dihydrobenz-1,4-thiazines obtained, for example, as follows.

An amino-2-mercapto-benz-thiazole (Teppema and Sebrell, Journal of the American Chemical Society, 1927, Vol. 49, p. 1756, 1781) is subjected to alkaline hydrolysis, for example, in accordance with the process described in British Patent No. 355,808. The so-obtained mercapto-phenylene-diamine (cf. also Bernthsen, Liebig's Annalen Vol. 251, page 64) is treated with chlorcacetic acid to give a diamino-phenyl-thioglycollic acid which when heated with dilute mineral acid gives the amino-3-keto-2,3-dihydrobenz-1,4-thiazine.

Such of the new dyestuffs obtained in accordance with the invention as may be sulphonated may, if desired, be sulphonated by the methods described, for instance, in British Patent No. 7,538 of 1896, referred to above.

The invention is illustrated but not limited by the following example in which the parts are by weight.

Example 1

10 parts of leuco-quinizarine, 5 parts of boric acid, and 15 parts of 7-amino-3-keto-2,3-dihydrobenz-1,4-thiazine, are stirred with 50 parts of pyridine. The mixture is kept just boiling for 3 hours. The yellow mixture gradually darkens in color and the product is thrown out of solution in dark greenish-blue crystals. Interaction being complete, the mixture is cooled and the product is filtered off, washed with alcohol, and finally with hot water.

When dry it forms a dark-blue micro-crystalline powder insoluble in hot water, but soluble in concentrated sulphuric acid to a blue solution.

The conversion of this product to the water-soluble dyestuff is carried out as follows:

10 parts of the product are boiled with 125 parts of aqueous caustic soda (32%) for 3 hours. 300 parts of cold water are added and the mixture filtered cold. The residue on the filter is dissolved in 1000 parts of hot water, precipitated again by adding salt and filtered off when cold. The dyestuff is dried at 50–60° C.

When dry it forms a dark blue powder which dissolves in warm water to a green solution. It is applied to the fiber in the following manner.

0.8 parts of dyestuff powder are dissolved in 400 parts of boiling water and 8 parts of well wetted wool are now entered, followed by 8 parts of a 10% solution of Glauber's salt. The solution is boiled for 1 hour, after which the fiber is removed, rinsed in cold water, and entered into a boiling solution of 10 parts of 7% aqueous hydrochloric acid and 200 parts of water. After 15 minutes the "lactamization" is complete and the fiber is rinsed in dilute sodium carbonate and dried. The wool is dyed a deep green shade, fast to potting. The remarkable fastness to potting is shown by the "lactamized" dyeing, not by the dyeing before treatment.

The amino-3-keto-2,3-dihydrobenz-1,4-thiazine used in the above example is obtained from nitrated 2-mercapto-benz-thiazole (cf. Teppema and Sebrell, Loc. cit.).

Example 2

10 parts of leuco-quinizarine, 5 parts of boric acid and 15 parts of 6-amino-3-keto-2,3-dihydrobenz-1,4-thiazine are mixed with 50 parts of pyridine, and the mixture is stirred and gently boiled for 4 hours. The product which gradually separates is filtered off, and treated further as described in Example 1. It then forms a dark amorphous powder, insoluble in water, but soluble in concentrated sulphuric acid to a blue solution. Instead of pyridine, dimethyl-aniline may be used.

The hydrolysis to the water-soluble dyestuff is carried out as described in Example 1.

The dyestuff is a dark blue powder. When it is applied to wool in the way described above, the fiber is dyed in a deep greenish-blue shade which shows the same remarkable fastness to potting as that of Example 1.

Example 3

10 parts of leuco-1,4,5-trihydroxy-anthraquinone, 5 parts of boric acid, and 15 parts of 7-amino-3-keto-2,3-dihydrobenz-1,4-thiazine, are stirred with 50 parts of pyridine. The mixture is simmered for 16 hours and then cooled. The product is filtered off and, if necessary, washed with alcohol, and with hot water.

When dry it forms a dark blue micro-crystalline powder, soluble in concentrated sulphuric acid with blue colors. This product is hydrolyzed to give the water-soluble dyestuff carried out as described in Example 1.

The new dyestuff obtained is applied to wool in the way already described. The "lactomized" shade is green, somewhat yellower than the shade of Example 1. The dyeing possesses excellent fastness to potting.

It will be understood that many variations are possible in our procedure without departing from the spirit of this invention.

In the claims below it should be understood that where new products, dyestuffs, or articles of manufacture are claimed, we mean to include these bodies not only in substance, but also in whatever state they exist when applied to material dyed, printed or pigmented therewith.

We claim:

1. An anthraquinone derivative corresponding to the general formula:

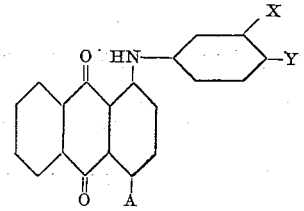

wherein X and Y respectively represent one or the other of a pair of substituents represented by NH₂ and S·CH₂·COOM (M=H or a metal), or wherein X and Y jointly represent the lactam formed from the above pair of substituents; wherein A stands for the radical OH, the group NHR (R=alkyl or aryl) or the group

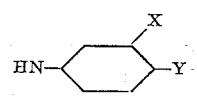

(X and Y having the same significance as above); and wherein the general formula includes auxochromic substitution derivatives of said anthraquinone derivative.

2. An anthraquinone compound corresponding to the general formula:

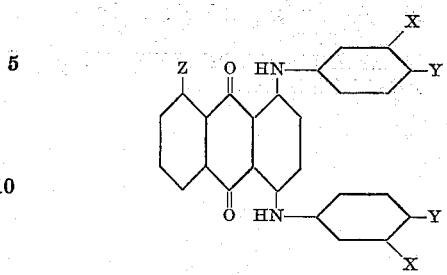

wherein X and Y respectively represent one or the other of a pair of substituents represented by NH₂ and S·CH₂·COOM (M=H or a metal), or wherein X and Y jointly represent the lactam formed from the above pair of substituents; wherein Z stands for H or OH; and wherein the above formula includes the sulfonation derivatives of said compound.

3. An anthraquinone compound corresponding to the general formula:

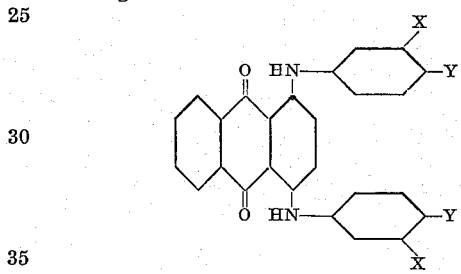

wherein X and Y respectively represent one or the other of a pair of substituents represented by NH₂ and S·CH₂·COOM (M=H or a metal), or wherein X and Y jointly represent the lactam formed from the above pair of substituents; and wherein the above formula includes the sulfonation derivative of said compound.

4. A compound of the group consisting of the o-amino-aryl-thioglycollic acid of the general formula:

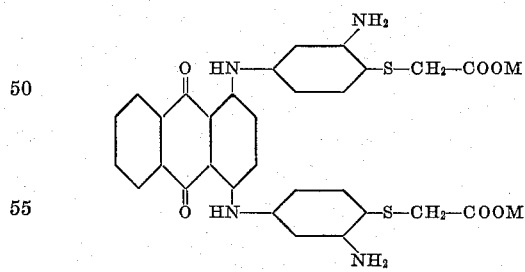

(M=H or a metal) and its corresponding lactam.

5. A compound of the group consisting of the o-amino-aryl-thioglycollic acid of the general formula

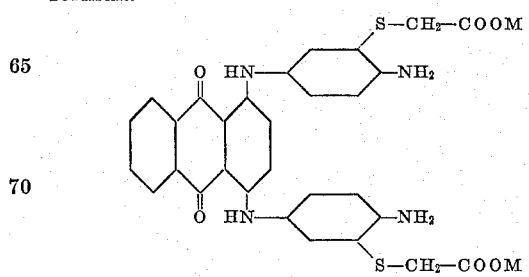

(M=H or a metal) and its corresponding lactam.

6. A dyestuff which in saponified form corresponds to the following formula

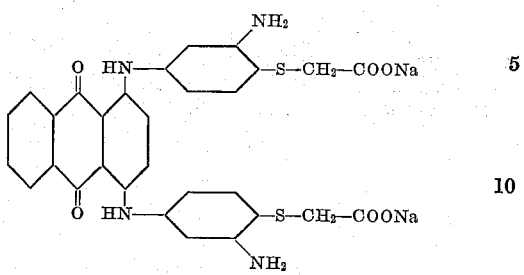

7. A dyestuff which in saponified form corresponds to the following formula

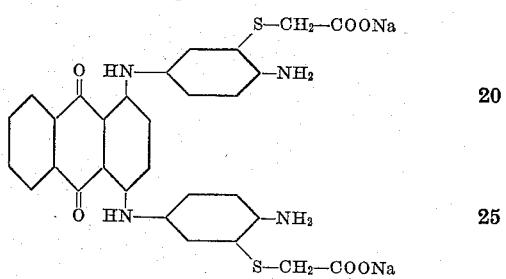

8. The process of preparing an anthraquinone derivative which comprises reacting a 1-hydroxy-anthraquinone compound with a thiazine selected from the group consisting of 6-amino- and 7-amino-3-keto-2,3-dihydrobenz-1,4-thiazine.

9. The process of preparing an anthraquinone derivative which comprises reacting a 1-hydroxy-anthraquinone compound selected from the group consisting of 1,4-dihydroxy-anthraquinone, 1,4,5-trihydroxy-anthraquinone, their leuco compounds and auxochromic substitution derivatives of said anthraquinones and leuco compounds thereof, with a thiazine selected from the group consisting of 6-amino- and 7-amino-3-keto-2,3-dihydrobenz-1,4-thiazine.

10. The process of preparing an anthraquinone derivative which comprises reacting leuco-quinizarine with a thiazine of the group consisting of 6-amino- and 7-amino-3-keto-2,3-dihydrobenz-1,4-thiazine.

11. A process as in claim 8, followed by the step of hydrolyzing the lactam product obtained to give the corresponding ortho-amino-thioglycollic acid compound.

12. A process as in claim 10, followed by the step of hydrolyzing the lactam product obtained to give the corresponding ortho-amino-thioglycollic acid compound.

13. A process for producing a dyestuff of the anthraquinone series, which comprises heating leuco-quinizarine and a thiazine of the group consisting of 6-amino- and 7-amino-3-keto-2,3-dihydrobenz-1,4-thiazine in a medium selected from the group consisting of pyridine and dimethyl-aniline, until the formation of a dark colored precipitate, recovering the latter and heating the same in aqueous caustic soda to hydrolyze the lactam groupings present.

14. A process as in claim 13, the first heating being carried out in the presence of a condensing agent.

15. A process as in claim 13, the first heating being carried out in the presence of boric acid.

16. A process as in claim 13, the first heating being followed by an oxidation treatment, to convert the leuco compound into the keto form.

17. A process as in claim 13, the reactants being taken substantially in the proportion of 15 parts of the thiazine body to 10 parts of the quinizarine body.

18. Animal fiber dyed with the lactam form of a dyestuff as defined in claim 1.

19. Animal fiber dyed with the lactam of a dyestuff as defined in claim 3.

20. Animal fiber dyed with the lactam of a dyestuff as defined in claim 4.

21. Animal fiber dyed with the lactam of a dyestuff as defined in claim 5.

NORMAN HULTON HADDOCK.
FRANK LODGE.